United States Patent
Wakerly et al.

(10) Patent No.: US 8,814,055 B2
(45) Date of Patent: *Aug. 26, 2014

(54) SECURE APPLICATION DIRECTORY

(71) Applicant: Google Inc., Mountain View, CA (US)

(72) Inventors: Michael John Wakerly, San Francisco, CA (US); Jonathan Wall, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,548

(22) Filed: Aug. 19, 2013

(65) Prior Publication Data

US 2013/0334318 A1    Dec. 19, 2013

Related U.S. Application Data

(63) Continuation of application No. 13/618,166, filed on Sep. 14, 2012, now Pat. No. 8,511,573, which is a continuation of application No. 13/234,849, filed on Sep. 16, 2011, now Pat. No. 8,313,036.

(51) Int. Cl.
*G06K 19/06*    (2006.01)

(52) U.S. Cl.
USPC .......................................... 235/492; 235/487

(58) Field of Classification Search
CPC ........ G06K 19/00; G06K 19/06; G06K 13/00
USPC ......................................... 235/492, 487, 476
See application file for complete search history.

(56) References Cited

U.S. PATENT DOCUMENTS

| | | | |
|---|---|---|---|
| 6,792,536 B1 * | 9/2004 | Teppler | 713/178 |
| 6,963,270 B1 * | 11/2005 | Gallagher et al. | 340/10.2 |
| 7,308,433 B1 | 12/2007 | Tomizawa | |
| 7,353,396 B2 * | 4/2008 | Micali et al. | 713/176 |
| 8,313,036 B1 * | 11/2012 | Wakerly et al. | 235/492 |
| 8,511,573 B2 * | 8/2013 | Wakerly et al. | 235/492 |
| 2006/0206704 A1 | 9/2006 | Gauby et al. | |
| 2011/0016275 A1 * | 1/2011 | Lemonnier et al. | 711/115 |

OTHER PUBLICATIONS

Savin, D., Canadian Office Action issued in Application No. 2,814,007, pp. 1-3, Apr. 11, 2014.

* cited by examiner

*Primary Examiner* — Daniel St Cyr
(74) *Attorney, Agent, or Firm* — Johnson, Marcou & Isaacs, LLC

(57) ABSTRACT

This disclosure relates to storing a secure application directory within a contactless smart card. The contactless smart card include secure memory area for storing software applications and may include a default application directory for listing the software applications stored within the contactless smart card to an external card reader. A second application directory is stored with an access key and a listing of a second set of software applications within the same contactless smart card. The second application directory includes improved application directory entries, where each application directory entry includes an application identifier, a starting memory block byte value, and a size byte value for each of the second set of software applications.

29 Claims, 4 Drawing Sheets

| Sector Memory 208 | Memory Block 212 | Bytes per block 216 → | | | Secure element namespace/ Installed software application memory 204 | | | | |
|---|---|---|---|---|---|---|---|---|---|
| | | 0 | 1 | 2 | .... | .... | 13 | 14 | 15 |
| 39 | 15 | | A Key 220A | | Access Memory Block 228A | | B Key 252A | | |
| | . | | . | | . | | . | | |
| | 3 | | . | | . | | . | | |
| | 2 | | Data Memory Block 232C | | Data Memory Block 232C | | . | | |
| | 1 | | . | | Data Memory Block 232B | | . | | |
| | 0 | | . | | Data Memory Block 232A | | . | | |
| 38 | 15 | | A Key 220B | | Access Memory Block 228B | | B Key 252B | | |
| | . | | . | | . | | . | | |
| | 2 | | . | | Data Memory Block 236A | | Data Memory Block 236A | | |
| | 1 | | . | | . | | . | | |
| | 0 | | . | | . | | . | | |
| . | . | | . | | . | | . | | |
| . | . | | . | | . | | . | | |
| 32 | 15 | | A Key 220C | | Access Memory Block 228C | | B Key 252C | | |
| | . | | . | | . | | . | | |
| | 3 | | . | | . | | . | | |
| | 2 | | . | | Data Memory Block 240C | | . | | |
| | 1 | | . | | . | | . | | |
| | 0 | | . | | . | | . | | |
| . | . | | A Key 220C | | Access Memory Block 228C | | B Key 252 | | |
| . | . | | . | | Data Memory Block 244 | | . | | |
| . | . | | . | | . | | . | | |
| . | . | | . | | . | | . | | |
| 1 | 3 | | A Key 220Y | | Access Memory Block 228Y | | B Key 252Y | | |
| | 2 | | . | | . | | . | | |
| | 1 | | . | | . | | . | | |
| | 0 | | . | | . | | . | | |
| 0 | 3 | | A Key 220Z | | Access Memory Block 228Z | | B Key 252Z | | |
| | 2 | | . | | Data Memory Block – Directory 248B | | . | | |
| | 1 | | . | | . | | . | | |
| | 0 | | | | Manufacture's Block 256 | | | | |

| Sector 312 | Memory Block 316 | Secure element namespace/ Installed software application memory 304 — Bytes per block 308 → | | | | | | |
|---|---|---|---|---|---|---|---|---|
| | | 0 | 1 | 2 | .... | .... | .... | 13 | 14 | 15 |
| 39 | 15 | A Key 320A Data Memory Block – Second Application Directory 328Z | | | Access Memory Block 324A Data Memory Block – Second Application Directory 328Z | | | B Key 340A Data Memory Block – Second Application Directory 328Z | | |
| | 14 | | | | | | | | | |
| | . | | | | . | | | | | |
| | 1 | | | | Data Memory Block 328B | | | | | |
| | 0 | | | | Data Memory Block 328A | | | | | |
| 38 | 15 | A Key 320B | | | Access Memory Block 324B | | | B Key 340B | | |
| | . | . | | | | | | . | | |
| | 2 | | | | Data Memory Block – Application data/software application 332C | | | Data Memory Block 332C | | |
| | 1 | | | | | | | | | |
| | 0 | | | | | | | | | |
| . | . | . | | | . | | | . | | |
| . | . | . | | | . | | | . | | |
| 0 | 3 | A Key 320Z | | | Access Memory Block 324Z Data Memory Block – Default/ Existing Application Directory 336B | | | B Key 340Z Data Memory Block 336B | | |
| | 2 | . | | | | | | . | | |
| | 1 | . | | | . | | | . | | |
| | 0 | Manufacture's Block 348 | | | | | | | | |

300B

| Sector 312 | Memory Block 316 | Secure element namespace/ Installed software application memory 304 — Bytes per block 308 → | | | | | | | | | | |
|---|---|---|---|---|---|---|---|---|---|---|---|
| | | 0 | 1 | 2 | .... | .... | .... | 13 | 14 | 15 |
| 39 | 15 | A Key 320A | | | Access Memory Block 324A | | | B Key 340A | | |
| | 14 | AID_51 352A | START 352B | SIZE 352C | AID_53 356A | START 356B | SIZE 356C | .... | .... | AID_55 360A | START 360B | SIZE 360C |
| | . | . | . | . | . | . | . | | | . | . | . |
| | 3 | AID_8 | START | SIZE | AID_9 | START | SIZE | .... | .... | AID_11 | START | SIZE |
| | 2 | Data Memory Block – New Application Directory 328A | | | Data Memory Block – New Application Directory 328A | | | Data Memory Block – New Application Directory 328A | | |
| | 1 | . | | | | | | | | | |
| | 0 | CRC 364A | | UNIQUE_ID 364B | | VER 364C | RESERVED 364D | | | | COUNT 364E |
| Sector 312 | Memory Block 316 | 0 | 1 | 2 | 3 | .... | .... | .... | 13 | 14 | 15 |

Fig. 3

SECURE APPLICATION DIRECTORY

REFERENCE TO RELATED APPLICATIONS

This patent application is a continuation of and claims priority to U.S. patent application Ser. No. 13/618,166, entitled "Secure Application Directory" and filed Sep. 14, 2012 which is a continuation of U.S. patent application Ser. No. 13/234,849, entitled "Secure Application Directory" and filed Sep. 16, 2011. The complete disclosures of the above-identified applications are hereby orated herein by reference.

TECHNICAL FIELD

The present disclosure relates generally to computer-implemented methods, devices, and computer-programs for a secure application directory in contactless smart cards.

BACKGROUND

Contactless transaction systems use secure contactless smart card for transaction purposes. Some exemplary transaction systems include transportation—transit cards, authentication and identity cards, parking cards, and phone cards. An exemplary secure contactless smart card is the MIFARE® card from NXP Semiconductors or an iClass® card from HID Global. Certain conventional smart cards use radio frequency identification (RFID) standards to transmit and receive information to and from a card reader device. RFID based contactless smart card devices are supported via the International Organization for Standardization and the International Electrotechnical Commission standard (ISO/IEC) 14443 for smart cards and card readers. Certain contactless smart cards may include multiple electronic components, such as an antenna and secure memory. Additionally, certain contactless smart cards also may include supporting semiconductor components, such as a memory management unit, a processor, and a cryptographic generator.

paragraphs 4-5, use definitive language. The different types of software applications or application data memory areas include random access memory (RAM), read only memory (ROM), and non-volatile flash memory. These memory areas may be secure memory areas for secure information required to access software applications for such purposes as external secure access systems, membership, or payment purposes. Further, each secure memory area is assigned specific application functions included in the secure element area within the contactless smart card. Certain low-end contactless smart cards may not offer significant processing capabilities; these smart cards may communicate only a radio frequency with information from a passive memory.

Certain contactless smart cards include a platform for hardware and software that supports both EMV (electronic credit card standards) and MIFARE® operating functions. Such cards further include a processor for retaining different areas within combined or separated secure elements of the contactless smart card device. Contactless smart cards are available in different memory sizes, for example, a 4 KB of EEPROM (flash memory) or a 1 KB EEPROM package. However, certain widely used smart cards do not have any intelligent processing capability and are software coded such that certain memory areas alone can be read by certain card readers. In many widely used contactless transaction cards, such as the MIFARE Classic®, a limited amount of resources are available within the smart card to enable further development. For example, on a 4 KB card, a requirement may exist that all of the 4 KB should be active within the card at any given time.

In some secure element namespaces, also referred to as "memory areas" within contactless cards, the available memory is statically partitioned. The card reader is encoded to read certain ones of the partitions. Accordingly, the card reader may read only from the pre-determined partitions. Further, each secure memory area is assigned specific application functions, included in the secure element area within the contactless smart card. A 4 KB contactless smart card includes data memory areas are typically divided into about 40 sectors, with 32 sectors of 4 blocks each and 8 sectors of 16 blocks each. One block is dedicated to manufacturer information for the contactless smart card, while a sector may be dedicated to a pre-installed application directory configured to direct an external card reader to one of several software applications stored in the contactless smart card. The application directory may point the external card reader to the application stored by the sector in which the application is stored. Accordingly, the data memory areas store applications by sectors and un-used memory blocks in a sector may be left idle.

SUMMARY

In certain exemplary embodiments, a computer-implemented method for a secure application directory in a contactless smart card comprises storing, in a data memory block of the contactless smart card, an application directory entry for one of a plurality of software applications stored in the contactless smart card, the application directory entry comprising: an application identifier (AID) for the software application; a starting memory block number for a starting memory block of the memory area, wherein the starting memory block holds at least a part of the software application; and; and a size for the software application, the size defining a number of data memory blocks from the starting data memory block for storing the entire software application; and storing, in an access memory block of the contactless smart card, an access key for access to read the application directory entry stored within the data memory block.

BRIEF DESCRIPTION OF THE DRAWINGS

FIG. 2 illustrates a memory structure of a 4 KB contactless smart card with a default or existing application directory according to certain exemplary embodiments.

FIG. 3 illustrates a memory structure of a 4 KB contactless smart card with a secure application directory according to certain exemplary embodiments.

DETAILED DESCRIPTION OF EXEMPLARY EMBODIMENTS

Overview

Figure 1:
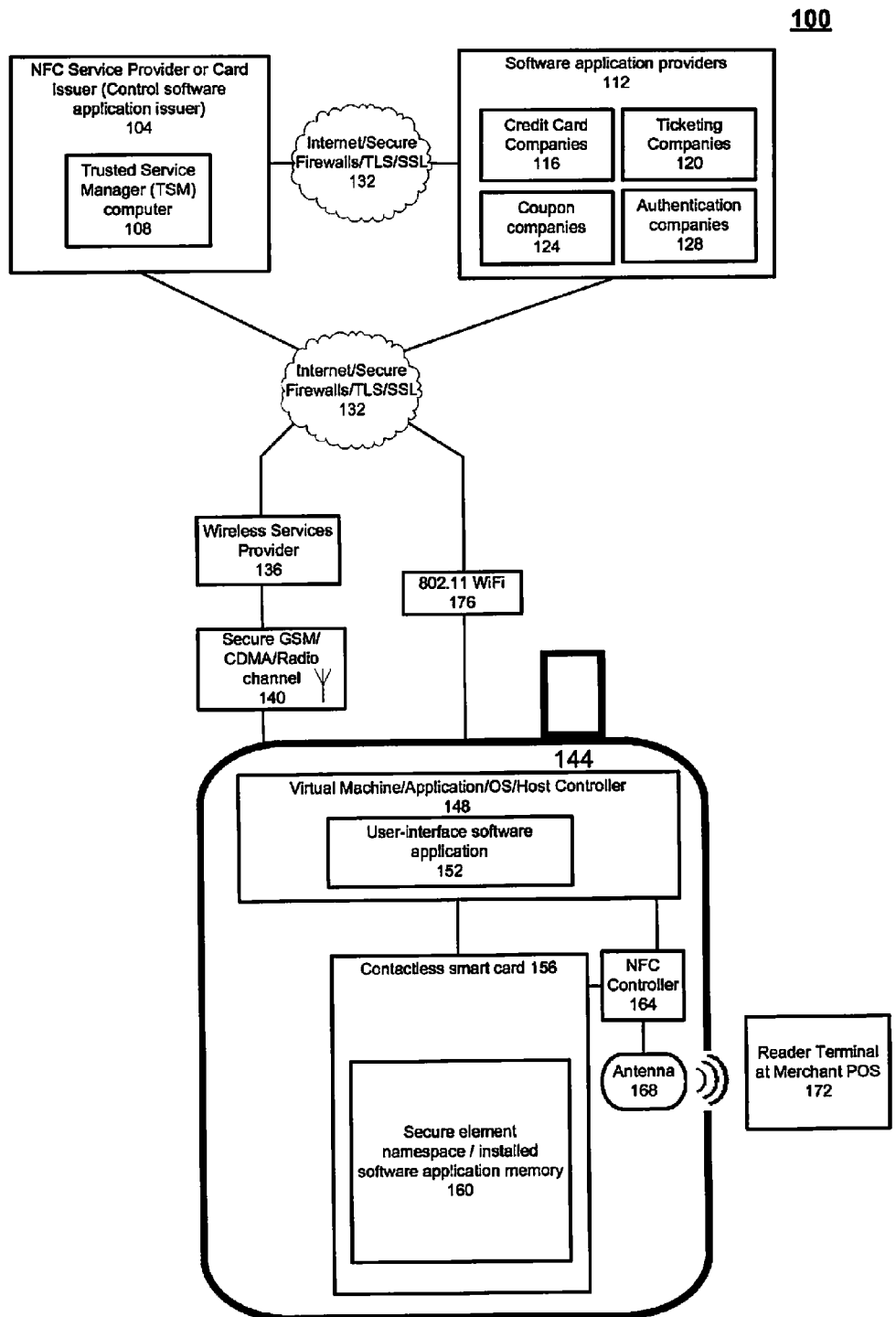
FIG. 1 illustrates a system for a contactless smart card device including a contactless smart card with a secure element, where the secure element has stored within it, and a secure application directory according to certain exemplary embodiments.

An application directory table reserves special blocks in the secure element namespace as metadata blocks. These blocks contain the logical mapping of application identifiers (AIDs) to the slot/block that contains the software application to be presented to an external card reader device. When the external card reader device encounters a contactless smart card, it tries to authenticate to the special metadata block identified in the directory with a defined access key known to the card reader and the software application. When the block is valid, the card reader reads the contents of an application directory table in the assigned block, and performs a look-up to find which sector/blocks to which the application ID is mapped. By way of an example, when a retailer's loyalty card has an AID of '10', a targeted card reader device would read the application directory table in the data memory block of the secure element namespace and lookup the AID '10'. While the directory service is a useful service, it requires the complete use of the block and its AID namespace and is managed externally by a third party.

Access key for a contactless smart card may provide different types of access to the application data or software application within the contactless smart card. In certain exemplary embodiments, "Key "A" or the "A Key" of sector 0 is a public sector access key with a 6 byte code, while key "B" or the "B Key" of sector 0 is determined by the contactless smart card issuer or card owner, where the card issuer controls certain access keys and a control software application or certain aspects of the other software applications on the contactless smart card. "Card issuer" or "card owner" are terms used interchangeably herein, and generally refer to the entity that places the secure element and an application directory within the contactless smart card. An NFC service provider may be an example of a card issuer type entity.

The B Key may be a 6 byte code that is kept private for making changes to the software application or the application data within the related memory block. "Application data" as used herein defines the data that augments, updates, or provides data to a software application. "Software application" as used herein refers to any software application obtained in any format from an external computer that can be installed and executed within the secure element of the contactless smart card. Further, "software application" and "application data" are used interchangeably herein to refer to the types of data stored within the secure element from an external computer. The term "software application" also includes all formats of the software application, from the downloaded format, any intermediate format, and the final executed format, unless otherwise described. In the data memory block for the application directory table in the secure element namespace, a software application is mapped using its 2 byte Application identifier (AID) by using a single byte cluster code for access control and another single byte as a software application code or the least significant bit (LSB).

In certain exemplary embodiments, the contactless smart card may be loaded with an application directory and software applications to perform the various secure functions as an independent card device. In certain exemplary embodiments, a contactless smart card device incorporates the contactless smart card and provides a user-interface software application access to the contactless smart card. Exemplary contactless smart card devices include smart phones; mobile phones; personal digital assistants (PDAs); mobile computing devices such as netbooks and iPad®s; electronically enabled key fobs; electronically enabled card type devices; and other electronically enabled devices, where each device can be used for a plurality of purposes including, but not limited to, financial transactions, coupons, ticketing, secure authentication, and related applications.

In certain exemplary embodiments, certain contactless smart cards or implementations of a contactless smart card, the secure element namespace can be divided into different partitions for different card types, including different card protocols or platforms, e.g., EMVCo on JavaCard platform, near field communication (NFC) for proximity sensing, or MIFARE. In one embodiment, for a 1 KB contactless smart card, the secure element namespace is virtually dividend into sectors, where each sector includes 4 memory blocks that are 16 bytes in length for each, with the options for sector sizing different from the pre-defined sector sizing, thereby including contiguous blocks, over contiguous sectors for a single software application.

The trailing block of each sector is a dedicated access memory block that is divided into the 3 memory sections for storage of access information to the remainder of the memory block. The access information includes an A Key, access bits within the access memory block, and a B Key. The access memory block controls access to the rest of the blocks in the sector depending on individual access keys or a combination of the access keys that is used to access the memory blocks. The remainder of the memory blocks in a sector is data memory blocks that contain application data or the software application. Software applications can also be stored across sectors by providing a pointer or continuity information to the ending bytes of the software application in a previous sector. The pointer may include the AID of the software application and the block location and sector location of the continuing section of the software application.

In certain exemplary embodiments, the access keys in the access memory block support different access types to the data memory block for the application data and the application directory table in sector 0. The access control block can be configured to describe the permissions of key A, while key B maintains the ability to rotate keys in the control block and to overwrite the access bits within the access control block. In the data memory block of sector 0, including the application directory table, key B may be used to edit the directory, to change the mapping of AIDs to sector and memory block locations, and to reallocate the memory blocks by changing the access type in the secure element namespace. These functionalities allow the contactless smart card to functionally support multiple applications and access types, depending on the access keys and the access bits in the access memory block. Access types that may be available to the contactless smart card include a write access, a read access, an increment access, a decrement access, or a combination of two or more of each of the read, write, and increment and decrement accesses. The write access includes the ability to write or install software applications or application data to data memory blocks within the secure element namespace.

Each of the sectors in the secure element namespace is assigned a unique identifier from which the device keysets are derived, where the unique identifier may be assigned to the contactless smart card at manufacture or by a card owner. The card owner may refer to the entity that deploys a secure element and the application directory structure on to the contactless smart card. By way of an example, a Services Identity Module (SIM), a secure digital (SD) memory card, or a Universal Integrated Circuit Card (UICC) manufacturer may be a card owner by embedding the secure element and application directory structure into the SIM, UICC, or SD card prior to selling it to a wireless service provider for deployment in a smart phone. Alternatively, a wireless service provider for a Global System for Mobile Communications (GSM), Universal Mobile Telecommunications System (UMTS), or Code Division Multiple Access (CDMA) may embed the secure element and create the application directory prior to selling the cards for enabling mobile communications.

Each of the "card manufacturer," the "card owner," or the "wireless service provider" may be referred to as a "card issuer" for providing the secure element and support application directory within the contactless smart card. In an exemplary embodiment, the term "card issuer" may also refer to service providers that create and deploy the control software application within the secure element of the contactless smart card, where the control software application can be used to control, initiate, and partition the secure element namespace. The application directory may be considered as an embedded software application at the embedding stage.

In certain exemplary embodiments, a contactless smart card device manufacturer or a contactless smart card device operating system developer may be considered to be the card issuer. The card issuer may, independently or in cooperation with the card owner, provide additional software application within the contactless smart card, via the secure element or an external secure element. The additional software application may perform a management role among a number of card protocols within the contactless smart card device using a single NFC controller and antenna, or may control the secure element namespace of the contactless smart card. Further, a software application provider provides software applications via over-the-air methods, using the card issuers services or though regular wireless Internet using the 802.11 standards.

Each sector of the secure element can, as a part of the application directory structure, store a single application with an application identification (AID), thereby enabling multiple software applications to co-exist within the contactless smart card. One memory block at sector address 0, may contain only the manufacturer's data, while the other memory blocks are data memory blocks which include AIDs of unique applications on the card and the access memory block which provides access to the application directory table. The manufacturer's data can used to trace the integrated circuit (IC) details in case of quality problems. So, sector 0 of the secure element namespace contains 2 data blocks of 16 bytes each, which is commonly the AID information of applications located in other memory blocks within the contactless smart card.

In certain exemplary embodiments, a software application on a contactless smart card in the context of a transit environment application allows a card reader to access the memory blocks of certain sectors to record where the transit system was entered or exited, to set initial values, and to decrement values on the card. The turnstile may be limited to access key A, which is a lower security key and authenticates the card reader turnstile to read card values and write the exit or entry point in a certain block of the contactless smart card depending on the access memory block assignment on the card. Accordingly, the transit software application may be stored in a certain block with references to other sectors for value— increment/decrement and for station—exit/entered, where the decrement value may be calculated from the station value allocation in the corresponding data memory block. Each sector may include a different set of Key A and Key B, where appropriate.

The software applications' provider, e.g., a transit office, would have access to key B for the initial value settings in a different sector and memory block of the contactless smart card, where the sector allows for writing using the key B. Accordingly, the card may be configured to allow key B accessible devices to write the initial value to a pre-determined "initial value" data memory block or sector of the contactless smart card. A different data memory block of a sector for storing "station information" includes different set of access keys, key A and key B, which allow the station information entry and exit to be registered. A value of charge can be calculated between the entry and exit stations and may then be applied to the "initial value" data memory block or sector of the contactless smart card when the card user exists at a station. The transit system verifies key A for the "initial value" data memory block or sector for reading the value remaining prior to allowing entry. A different key B writes the entry location into the station information data memory block allocated and protected by the key B. When the turnstile is exited, the card is notified, and the fare is calculated from the exit and entry points and is decremented from the initial value, while wiping the initial location. Alternatively, when the decrement value is greater than the initial value, the card will signal the turnstile to prevent exit. Adding more value to the card using key B for access via a ticket machine or at an office will rectify the problem.

Contactless smart cards can be manufactured with known default keys (for example, 0xFF is a typical default key) for initialization purposes. Since the default keys are known, the security element embedded on the contactless smart card or within the contactless smart card device may be considered as disabled, which implies that access may be prevented via the contactless interface (external card readers) or a contact interface, such as, applications programming interface (API) or a different software application within the secure element. The runtime environment of the secure element or the contactless smart card device that hosts the secure element may support the APIs. Once the keys in the sector are designated by the initial setting device at the card manufacture's location or the card issuer's (or owner) location using a set of access keys, a main access key, key B, will have exclusive management access to the sector with any option for overrides. Accordingly, the rotation or changing of the keys is set into a known state to preserve control of the memory blocks. Messages, software application, or application data within the memory blocks are generally in plaintext format, while the encrypted message (encrypted by the applicable keys—A or B) is in a ciphertext format. Key B may be used to change Key A in certain sectors, as well as the access bits associated with the key may be changed for certain sectors.

In certain exemplary embodiments, the card reader terminal or device reads the contactless smart card by browsing through the secure element memory for the relevant application directory, and then scanning the AIDs for a pre-determined software application AID or a pre-determined sector as specified in the card reader. An application directory (AD) can establish a data structure table for directory and application entries, thereby enabling the reader to identify the correct software applications with which to being transactions. The contactless smart card can be seen as a memory storage area, as the card reader will request application data from the memory storage area for processing such applications as payment or even transit. The contactless smart card typically provides a random number challenge to the card reader, while the card reader provides its own response, using a mutual secret key, back to the contactless smart card. The contactless smart card then verifies the response from the card reader by comparing its random number to ensure the same secret key. Thereafter the actual transaction is processed using the encryption secret key that is mutually agreed upon.

In certain exemplary embodiments, the transit software application in a contactless smart card may include multiple software applications or for different regions or purposes. By way of an example, a New York Transit system and a Los Angeles Transit system, may provide different software applications to a single contactless smart card within a contactless smart card device. The two software applications can be used on terminals in the corresponding locations as the corresponding card readers can automatically determine which directory to access by checking the AD. The information or the application directory data in the directory part of the data memory block provides the reference section of the AD, and includes pointers to the card issuer or a manufacturer's sector for information on the distribution of the remaining free card sectors where the software applications are allocated.

In certain exemplary embodiments, the secure element namespace may be managed by the control software application. The control software application may be a JavaCard applet executing on a JavaCard Virtual Machine within a different secure element namespace in the contactless smart card device incorporating the contactless smart card. Accordingly, the JavaCard applet may control the deployment of access keys, software applications, application data, the application directory, and the access bits in the access memory blocks using APIs and interacting with the secure element of the contactless smart card via a secure communication channel.

In certain exemplary embodiments, a contactless smart card may include more than one application directory, where each application directory is readable by an external card reader only when the external card reader knows the access key and the location of the application directory. Accordingly, for a 4 KB contactless smart card, a default application directory may be stored in sector 0 of the contactless smart card, where AIDs of various applications within a fixed number of sectors are available to external card readers capable of accessing sector 0, reading the default application directory, and transacting with software applications linked in the default application directory. The implementation of two application directories may effectively splits the memory area of the contactless smart card into two types of applications or for different types of external card readers.

System Architecture

In certain exemplary embodiments, a second application directory may be stored within the namespace of the 4 KB-40 sector contactless smart card. The second application directory may be assigned an application identifier (AID) for identification via the default application directory within the contactless smart card. By way of an example, a code of 0x000 may be the default application directory AID. The contactless smart card may be configured to include 32 sectors at 4 memory blocks per sector, each sector of 16 bytes of length. The remaining 8 sectors may be configured to include 16 memory blocks per sector, each memory block at 16 bytes of length. In an exemplary embodiment, the second application directory is stored in sector 39 of a 40 sector, 4 KB contactless smart card. Accordingly, sector 39 is a 16 block sector, where 15 memory blocks may be data memory blocks for storing application data, with the last memory block forming the access memory block for the sector. The access memory block may include two access keys and an access bits defining one of a number of access conditions available to the sector. The application directory in sector 39 may be protected via an access key for reading purposes, where only external card readers with the read access key may access the second application directory. As a result of the configuration settings of the sectors of the 4 KB-40 sector contactless smart card; there are multiple levels of application data available to external card readers.

In certain exemplary embodiments, the default application directory stored in sector 0 provides access to 15 sectors available for default application data storage. By storing the second application directory in sector 39, the 4 KB-40 sector contactless smart card includes 153 individual 16-byte data memory blocks for the second set of application data storage. This may be calculated by discounting 1 access memory block from the sectors 16 through 39, thereby providing 16 (4-memory block type) sectors multiplied with 3 data memory blocks per sector for a second set of application data storage, and sectors 32 through 39 (16-memory block type) sectors, providing 7 sectors multiplied with 15 data memory block per sector for the second set of application data storage. Further, the second application directory occupies 16 memory blocks of sector 39, thereby providing 56 concurrently installed applications to be listed via the second set of application identifiers (AIDs), where each of the second set of AIDs provides a reference to a second set of software applications stored within the contactless smart card.

In certain exemplary embodiments, software applications or application data may not need to be stored per sector as in the case of the default application directory. The second application director includes improved application directory entries, where the improved application directory entry is a 4 byte entry including a 2 byte second application identifier (AID), a single byte start value, and a single byte size value for each of the second set of software applications. The single byte start value corresponds to the starting block number assigned to each of the second set of software applications stored within the contactless smart card. For a 1 KB, 16 sector type smart card, there may be limited space for defining two application directories and associated default set and second set of software applications. However, such an implementation may be apparent for segregating the namespace of the contactless smart card into two access types or for different types of external card readers.

In certain exemplary embodiments, the start value may be an absolute memory address of the memory block calculated by multiplying the number of memory blocks per sector from the first available memory sector and amending the number by 1. By way of an example, to find the absolute address (starting memory block) for a software application stored at sector 2, memory block 1, when the software application is 4 memory blocks in length, the calculation involves finding the number of memory blocks in the first available sector, e.g., sector 0 in this case, excluding memory block 0 for manufacturer's information. For a sector 2, where sector 2 is a 4 block sector, the number of blocks from the first available memory block is 8, where the first available memory block is memory block 1 in sector 0, and the number of memory block from memory block 1, sector 0 to memory block 1, sector 2, including the access memory blocks is 8. The resulting value is incremented by 1 to account for absolute, zero-based addressing, thereby resulting in a start value of 9.

In certain exemplary embodiments, the size value of the improved application directory entry can be further divided into a lower nibble and an upper nibble, the lower nibble for storing an entry size value, while the upper nibble is reserved for future use or as an error or logging flag. Further size value of a stored software application refers to contiguous blocks of data memory blocks in the sectors of the contactless smart card, ignoring the access memory blocks. By way of an example, an application starting at block 9 (sector 2, memory block 1) with size 4, would be stored in blocks 1 and 2 of sector 2 and then blocks 0 and 1 of sector 3, avoiding the access memory blocks in between.

In certain exemplary embodiments, the structure of the second application directory stored in sector 39 may include a header entry for recognition by an external card reader, similar to the manufacturer's memory block in sector 0. The header memory block of sector 39 includes a 2 byte cyclic redundancy check (CRC), a 4 byte unique identifier for the application directory provider, a single byte version code, an 8 byte reserved area, and a single byte entry count. Further, the CRC value includes a CRC 16 verification for the application directory, the CRC 16 verification following the definition of CRC_B as stated in the ISO/IEC 14443 standards. The unique identifier identifies the owner or issuer of the second application directory, and external card readers may verify the unique identifier prior to accessing linked software applications or application data.

The version code provides space for storage of revision information related to the second application directory, while the entry count stores a number corresponding to the number of active software applications registered with the second application directory. Further, the entries in the second application directory may be pre-sorted in an ascending or descending order, thereby making it easier for an external card reader to locate the preferred software application for reading. In another exemplary embodiment, a transaction log may be made available within the memory area assigned to the second set of software applications. Accordingly, the transaction log may be implemented as a software application with a default AID, such as 0xfffe, stored as one of the second set of software applications within a pre-determined area in the contactless smart card assigned for the second application directory. Further, in an exemplary embodiment, an application directory entry for the transaction log may define the transaction log from a minimum size of 1 block to a maximum size of 15 blocks, per the requirement of the transaction volumes, and the number of the second set of software applications stored within the memory area of the second application directory. The transaction log may, therefore, be assigned an AID that is referenced in the second application directory as an entry.

The transaction log may store codes for activities involving the second set of software applications of the contactless smart card, where in one example, a transaction status is logged in the transaction log when the contactless smart card transacts with an external card reader. The structure of the transaction log includes a 2 byte CRC_B verification code, a single byte log, a single byte count field for the number of AIDs of active software applications available for transaction purposes, an 8 byte reader identifier field for identifying the external card reader that is in transaction with the software applications on the contactless smart card, and an AID for the active second software application in transaction with the external card reader. The transaction log may be used by external card reader, when the AID of the transaction log exists in the second application directory. For the reader identifier, the first 3 bytes are an organization identifier to identify the organization/owner of the reader device, where the 3 bytes match a standard identifier following Institute of Electrical and Electronics Engineers (IEEE) Organizationally Unique Identifier (OUI) standards. Five bytes remaining in the reader identifier are assigned for unique codes within the 8 byte reader identifier, where the unique codes are globally unique for the life of an external card reader. By way of an example, a 48 bit Media Access Control (MAC) address may be used as a unique code for the 8 byte section of the reader identifier.

The single byte log in the transaction log includes a transaction status to log post-transaction results between the contactless smart card and the external card reader. By way of an example, the transaction statues available for storage include, an AID not found status code, an AID read success status code, an AID read failure status code, and a final reserved status code. Further, the single byte log may log the application directory status interaction with the external card reader. The final reserved status code may be used for storing a status of the actual transaction with a software application after the application directory has forwarded the external card reader to a select software application.

The AIDs for the second application directory may include a 12 bit merchant prefix and a 4 bit program code. The program code divides the merchant prefix by the type of merchant. By way of an example, in the program code, 0x0 is an undefined/uncategorized program code, 0x1 is a loyalty card program code, 0x2 is a coupon program code, 0x3 is a prepaid gift card program code, 0x4 to 0xf are reserved for other categories. An AID with code 0xfed2 can be decoded by merchant prefix 0xfed, with program code 0x2.

The control software application or the control applet, and the wallet software application (user-interface software application) perform service and provisioning of the secure element namespace and provide a convenient interface to ensure that the software application providers or the card issuer provisions the memory using correct application IDs (AIDs). This action ensures that new software applications do not overwrite the application software or application data of other software applications in the secure element namespace. For the software application providers to interact with the control software application, the card issuer publishes a protocol, which may be in a message format and an associated transaction model. The initiation of provisioning can be driven from the wallet software application by the user. Once a credential has been provisioned for a partner (one of a number of software application providers), the solution provides a callback identifier that the software application provider can use to deliver push notifications to the device.

In certain exemplary embodiments, all control applet transactions can be initiated by the wallet software application, even if a transaction occurs as a consequence of a pushed event notification. The wallet software application can be the initiator of the transaction. In this method, the control software application solution may be different from the traditional EMVCo provisioning in that, in the control software application, the wallet software application is the master and the software applications are slaves of the transaction. Conversely, for EMVCo provisioning, the software application providers (for example, financial institutions or transit systems) are the masters of the transactions and the wallet software application is the slave without knowledge of even what actions are being performed to it by the software application provider, via the TSM. This design can alleviate the necessity of a TSM, as the control applet in conjunction with the wallet software application, and an asymmetric key-pair cryptography algorithm plays the role of the trusted neutral and secure software application provider. The control software application may additionally define all interactions that will be driven over a secure channel (enforced by at least a secure socket layer or SSL).

In certain exemplary embodiments, the control software application implementation is performed via a Representative State Transfer (RESTful) interface, which is a stateless client-server architecture, using messages in a defined JavaScript Object Notification or JSON format. The control software application involves transaction in a sequence of events that starts with the wallet software application sending a commence provision message to a partner device, where the partner device may be a non-TSM computer or a TSM computer operating as a remote server host for multiple software applications. The commence message includes the information necessary for the non-TSM computer to encode a 'manage transaction' response that is securely returned to the wallet software application. The partner uses the information in the commence transaction message to encode data in the response message. For example, the commence message can include the public key for the control applet to match with a private key stored in the contactless smart card device.

FIG. 1 illustrates a system 100 for a contactless smart card device 144 including a contactless smart card 156 with a secure element 160, where the secure element 160 has stored within it, a secure application directory according to certain exemplary embodiments. Software applications are deployed to the contactless smart card device 144 from a trusted service manager (TSM) 108 hosted by a near field communication (NFC) service provider 104 or software application providers 112. Further, the TSM may receive software applications from the providers 112 via a secure communication internet channel 132, where the providers 112 include servers hosting a software application for different merchants and merchant types, such as credit card companies 116, ticketing companies 120, coupon companies 124, and authentication companies 128.

The software applications from the TSM 108 may be deployed to the contactless smart card device 144 via a secure wireless connection, e.g., GSM and CDMA 140 using a wireless service provider 136 as a proxy server. Alternatively, the TSM 108 deploys software applications to the contactless smart card 144 via a secure wireless 802.11 standard connection to a Wi-Fi enabled device 144. The software applications may be requested by an end-user using a user-interface software application 152 on the device 144. The received software applications deploy directly to the secure element namespace 160 or a secure memory in the contactless smart card 156. The contactless smart card interacts with an external card reader device 172 via the NFC controller chip 164 and an antenna 168 configured to transmit and receive radio frequency signals.

In certain exemplary embodiments, the contactless smart card 156 is an independent card device capable of interacting with an external reader device 172 independent of any contactless smart card device serving as its host. The contactless smart card 156 may then be loaded with software applications using an external card reader device especially configured to provision the namespace 160 of the contactless smart card device 156 using radio frequency signals and a write access key to write software applications or application data to the appropriate areas of the namespace.

FIG. 2 illustrates a memory structure 200 of a 4 KB contactless smart card with a default or existing application directory 248B according to certain exemplary embodiments. The secure element namespace 204 is divided, virtually, into 40 sectors 208, each sector including a number of memory blocks 212. Further, the 40 sectors include 32 sectors of 4 memory blocks and 8 sectors of 16 memory blocks. Each sector includes at least one access memory block 220, 228, and 252, for access control of the blocks within the sector. In each sector, the remaining blocks may be reserved as data memory blocks for storing software applications or application data. Each memory block, for an access or data type memory block, includes 16 bytes per block 216 of access or data stored within it.

The access memory blocks for each sector stores an A keys 220A-Z, access bits in access memory blocks 228A-Z, and a B keys 252A-Z for accessing the sectors' memory blocks, where either the A key 220, the B key 252, or a combination of both the access keys 220 and 252 may be used to define different access types stored as access bits within the memory blocks of each sector. By way of an example, in certain sectors, an external card reader may only access data memory blocks for reading stored application data, e.g., in an authentication card, the authentication information may be stored in the data memory blocks, where the external card reader may only read the authentication information, but not edit it. A specialized external card reader device with write access key may be used to edit the authentication information in the data memory block.

In an example, for the transaction log, the sector including the transaction logs within the data memory block of the sector may be configured to be accessed for writing purposes by the external card reader, to write the card reader's reader identifier to the transaction log. The external card reader provides the contactless smart card with its write access key prior to being allowed any write access. Sectors 0 has one data memory block 256 assigned for manufacturer's information. The manufacturer of the contactless smart card may store card unique identifier, which may be used by a card issuer to generate the default access keys for the A key and the B key. Thereafter, the card issuer may change the access keys and store new access keys within the contactless smart card for use by specialized external card readers, according to the type of function provided by the external card readers.

FIG. 3 illustrates a memory structure 300A-B of a 4 KB contactless smart card with a secure application directory 328A-Z according to certain exemplary embodiments. In the memory structure illustration of 300A, the secure element namespace 304 includes a default or existing application directory 336B, where a limited number of the 40 sectors 312 are allocated to the default application directory. This allows legacy card readers to read existing software applications within the namespace of the contactless smart card. The default application directory 336B may generally be stored in sector 0 of the secure element namespace, with sectors 0-15 assigned to the default application directory. Further, the sectors 0-15 may be 4-memory blocks 316 per-sector type memory areas for storing default or legacy software applications. The second application directory is stored in sector 39 and includes 15 data memory blocks for storing AIDs relating to a second set of software applications. The second application directory 328 may be accessed by an external card reader, provided that the external card reader has access to a read type for accessing and finding the application directory 328 and linking to software applications stored within sectors of the memory area associated with the second application directory, e.g., 328A-Z. Since sectors 0-15 are associated with the default application directory, sectors 16-39 may be configured to store the second set of software applications.

The memory structure illustration of 300B includes more details for sector 39 of the contactless smart card, where sector 39 stores the second application directory 328. Memory block 15 of the series of memory blocks 316 in sector 39 includes the access memory blocks including 320A, 324A, and 340A. The A key 320A may be configured to provide read access to external card readers, e.g., turnstiles and other transaction devices. The external card readers are then provided access to read the second application directory starting at data memory block 1 to memory block 14. Memory block 9 of sector 39 is reserved for a header entry including 364A-E, for the CRC, UNIQUE_ID, version, count, and reserved areas. Data memory blocks 0 to 16 each 16 bytes per memory block, where 4 bytes of data memory block is an application directory entry. By way of an example, as described in detail above, the application directory entry includes an AID of a target software application 352A, 356A, and 360A; the start byte value 352B, 356B, and 360B; and the size byte value for the target software application 352A, 352B, and 352C.

System Process

Figure 4:
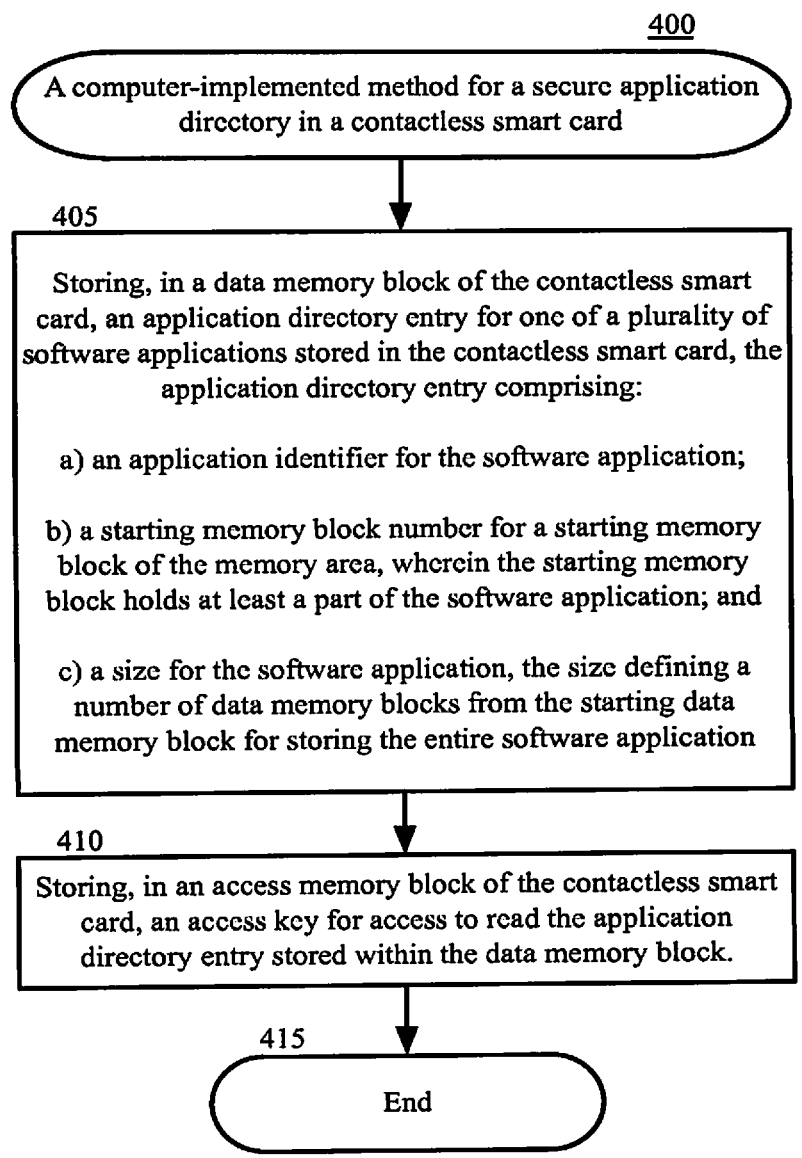
FIG. 4 illustrates a computer-implemented method for a secure application directory in contactless smart cards according to certain exemplary embodiments.

FIG. 4 illustrates a computer-implemented method 400 for a secure application directory in contactless smart cards according to certain exemplary embodiments. Once the second application directory is defined in terms of number of software applications, size of the secure element namespace, and the access control information, block 405 stores the information in respective memory blocks of the contactless smart card. In block 405, an external card reader device with write access permissions to memory blocks in sectors 16-39 may access sector 39 to write an application directory entry for one of a number of software applications stored in the contactless smart card. The storing process of block 405 includes writing an application identifier (AID) for the software application; a starting memory block number for a starting memory block of the memory area, where the starting memory block holds at least a part of the software application; and a size for the software application, the size defining a number of data memory blocks from the starting data memory block for storing the entire software application.

Block 410 performs a storing function for storing an access key for access to read the application directory entry stored within the data memory block. The access key for reading the application directory in stored in access memory block of the contactless smart card, the access memory block providing access control over the sector of the contactless smart card including the application directory entry.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the disclosure. Accordingly, such alternative embodiments are included in the disclosures described herein.

The exemplary embodiments can be used with computer hardware and software that perform the methods and processing functions described above. As will be appreciated by those having ordinary skill in that art, the systems, methods, and procedures described herein can be embodied in a programmable computer, computer executable software, or digital circuitry. The software can be stored on computer readable media. For example, "computer-coded," "software," "scripts," "computer-readable software code," and "programs" are software codes used interchangeably for the purposes of simplicity in this disclosure. Further, "memory," "computer-program product" and storage can include such media as, floppy disk, RAM, ROM, hard disk, removable media, flash memory, memory stick, optical media, magneto-optical media, CD-ROM, etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for storing multiple applications in single sectors of mobile device memory namespaces, comprising:
    storing, for each application stored in a mobile device memory namespace, an application directory entry in a data memory block of an application directory in the mobile device memory namespace, each application directory entry comprising:
        an application identifier (AID) for each corresponding software application stored in one or more data memory blocks of a sector of the mobile device memory namespace;
        a starting memory block number for a starting memory block in the sector of the mobile device memory namespace, wherein the starting memory block holds at least a part of a corresponding software application; and
        a size for the corresponding software application, the size defining a number of contiguous data memory blocks including the starting data memory block that store the entire corresponding software application.

2. The method according to claim 1, wherein the mobile device memory namespace comprises a default or existing application directory, different from the secure application directory, and stored in a different data memory block of the mobile device memory namespace.

3. The method according to claim 1, wherein the starting memory block number is a single byte value comprising an absolute value for an address of the data memory block in the mobile device memory namespace, the absolute value calculated using a zero-based numbering system.

4. The method according to claim 1, wherein the starting memory block number is a single byte value for an absolute memory in the mobile device memory namespace address, calculated as a sum of a product of the size of the software application stored in the memory block and a reference index of the memory block, and a memory address of the first memory block within the reference index of the memory block.

5. The method according to claim 1, wherein the size of the software application is in the form of a single byte having a value for the number of contiguous memory blocks assigned to store the software application.

6. The method according to claim 1, wherein the size of the software application is in the form of a single byte, and wherein the single byte further comprises a lower nibble with a value for the number of contiguous memory blocks assigned to store the software application.

7. The method according to claim 1, further comprising a group of log memory blocks for recording transactions performed by an external card reader and the mobile device memory namespace.

8. The method according to claim 1, wherein the AID comprises a software code defining a type of software application related to the AID, the type of software application defined as one among a loyalty card software application, a coupon software application, a prepaid gift card software application, and a transit card software application.

9. The method according to claim 1, further comprising storing, for each application stored in the mobile device memory namespace, an access key for read access to the application directory in an access memory block of the application directory.

10. The method according to claim 9, wherein a second access key is stored in the access memory block for access to edit the application directory entry stored in the data memory block of the application directory.

11. A mobile device with a secure application directory, comprising:
    a mobile device memory namespace comprising a plurality of sectors, each sector comprising a plurality of data memory blocks;

an application directory in a sector of the mobile device memory namespace, wherein the application directory comprises, for each software application stored in the mobile device memory namespace, an application directory entry stored in a data memory block of the application directory, each application directory entry comprising:
- an application identifier (AID) for each corresponding software application stored in one or more data memory blocks of a sector of the mobile device memory namespace;
- a starting memory block number for a starting memory block in the sector of the mobile device memory namespace, wherein the starting memory block holds at least a part of a corresponding software application; and
- a size for the corresponding software application, the size defining a number of contiguous data memory blocks from the starting data memory block that store a remainder of the corresponding software application.

12. The mobile device according to claim 11, wherein the mobile device comprises a default or existing application directory, different from the secure application directory, and stored in a different data memory block of the smart card.

13. The smart card according to claim 11, wherein the starting memory block number is a single byte value comprising an absolute value for an address of the data memory block in the mobile device memory namespace, the absolute value calculated using a zero-based numbering system.

14. The mobile device according to claim 11, wherein the starting memory block number is a single byte value for an absolute memory address calculated as a sum of a product of the size of the software application stored in the memory block and a reference index of the memory block, and a memory address of the first memory block within the reference index of the memory block.

15. The mobile device according to claim 11, wherein the size of the software application is in the form of a single byte having a value for the number of contiguous memory blocks assigned to store the software application.

16. The mobile device according to claim 11, wherein the size of the software application is in the form of a single byte, and wherein the single byte further comprises a lower nibble with a value for the number of contiguous memory blocks assigned to store the software application.

17. The mobile device according to claim 11, further comprising a group of log memory blocks for recording transactions performed by an external card reader and the mobile device.

18. The mobile device according to claim 11, wherein the AID comprises a software code defining a type of software application related to the AID, the type of software application defined as one among a loyalty card software application, a coupon software application, a prepaid gift card software application, and a transit card software application.

19. The mobile device according to claim 18, wherein a second access key is stored in the access memory block for access to edit the application directory entry stored in the data memory block of the application directory.

20. The mobile device according to claim 11, wherein the application directory comprises an access memory block for storing, for each software application stored in the mobile device memory namespace, an access memory key for read access to the application directory, and an application directory entry stored in the data memory blocks of the application directory.

21. A computer-program product, comprising:
a non-transitory computer-executable storage device having computer-executable program instructions embodied thereon that when executed by a computer cause the computer to store multiple applications in a single sector of a mobile device memory namespace, the computer-executable program instructions comprising:
computer-executable program instructions for storing, for each application stored in the mobile device memory namespace, an application directory entry in a data memory block of an application directory in the mobile device memory namespace, each application directory entry comprising:
- an application identifier (AID) for each application stored in one or more data memory blocks of a sector of the mobile device memory namespace,
- a starting memory block number for a starting memory block in the sector of the mobile device memory namespace, wherein the starting memory block holds at least a part of a corresponding software application; and
- a size for the corresponding software application, the size defining a number of contiguous data memory blocks from the starting data memory block that store a remainder of the corresponding software application.

22. The computer-program product according to claim 21, wherein the mobile device memory namespace comprises a default or existing application directory, different from the secure application directory, and stored in a different data memory block of the mobile device memory namespace.

23. The computer-program product according to claim 21, wherein the starting memory block number is a single byte value comprising an absolute value for an address of the data memory block in the namespace, the absolute value calculated using a zero-based numbering system.

24. The computer-program product according to claim 21, wherein the starting memory block number is a single byte value for an absolute memory address calculated as a sum of a product of the size of the software application stored in the memory block and a reference index of the memory block, and a memory address of the first memory block within the reference index of the memory block.

25. The computer-program product according to claim 21, wherein the size of the software application is in the form of a single byte, and wherein the single byte further comprises a lower nibble with a value for the number of contiguous memory blocks assigned to store the software application.

26. The computer-program product according to claim 21, further comprising a group of log memory blocks for recording transactions performed by an external card reader and the mobile device memory namespace.

27. The computer-program product according to claim 21, wherein the AID comprises a software code defining a type of software application related to the AID, the type of software application defined as one among a loyalty card software application, a coupon software application, a prepaid gift card software application, and a transit card software application.

28. The computer-program product according to claim 21, further comprising computer readable software code for storing, for each application stored in the mobile device memory namespace, an access key for read access to the application directory in an access memory block of the application directory.

29. The computer-program product according to claim 28, wherein a second access key is stored in the access memory block for access to edit the application directory entry stored in the data memory block of the application directory.

* * * * *